US007543609B2

(12) United States Patent
Sollars, Jr.

(10) Patent No.: US 7,543,609 B2
(45) Date of Patent: *Jun. 9, 2009

(54) INFLATABLE FABRICS COMPRISING BASKET-WOVEN ATTACHMENT POINTS BETWEEN FABRIC PANELS

(75) Inventor: John A. Sollars, Jr., LeGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/221,977

(22) Filed: Aug. 8, 2008

(65) Prior Publication Data

US 2008/0302438 A1 Dec. 11, 2008

Related U.S. Application Data

(63) Continuation of application No. 11/473,707, filed on Jun. 23, 2006, now Pat. No. 7,409,970, which is a continuation of application No. 10/408,874, filed on Apr. 8, 2003, now Pat. No. 7,069,961, which is a continuation of application No. 09/406,264, filed on Sep. 24, 1999, now Pat. No. 6,220,309.

(51) Int. Cl.
*B60R 21/16* (2006.01)
*D03D 1/04* (2006.01)
*D03D 3/02* (2006.01)

(52) U.S. Cl. .................... 139/389; 280/728.1; 428/36.1

(58) Field of Classification Search ...................... 2/2.5; 139/383 R, 391, 394, 420 R, 426 R
See application file for complete search history.

(56) References Cited

U.S. PATENT DOCUMENTS 1,423,524 A 7/1922 Hill et al.
3,008,214 A 11/1961 Foster et al. .................. 28/80
3,294,605 A 12/1966 Fischer ........................ 156/65

(Continued)

FOREIGN PATENT DOCUMENTS

EP 0955214 11/1999

(Continued)

OTHER PUBLICATIONS

ASTM D737-96, "Standard Test Method for Air Permeability of Textile Fabrics".

(Continued)

*Primary Examiner*—Bobby H Muromoto, Jr.
(74) *Attorney, Agent, or Firm*—Cheryl J. Brickey

(57) ABSTRACT

All-woven inflatable fabrics having areas of two layers and attachment points or "seams" where single layers of fabric are formed. Such single fabric layers may be constructed solely through the utilization of basket weave patterns. These specific single fabric layers provide a relatively effective manner of reducing air permeability within the entire fabric article by decreasing the possibility of yarn shifting upon inflation of the inflatable fabric. Alternatively, the presence of at least a second single fabric layer area adjacent to the first and separated by and narrow double fabric layer area can further reduce the possibility of yarn shifting in the first single fabric layer area. Such a fabric may be utilized in numerous and various applications wherein fabric inflation is desired or necessary. In particular, the inventive fabric may be incorporated within an airbag cushion.

7 Claims, 1 Drawing Sheet

U.S. PATENT DOCUMENTS 3,360,015 A 12/1967 Hughes .................. 139/389
3,705,645 A 12/1972 Komen .................. 206/46
3,792,873 A 2/1974 Buchner et al. .......... 280/743.1
4,217,256 A 8/1980 Peerman et al. .......... 260/18
4,668,545 A 5/1987 Lowe .................. 428/35.1
4,702,597 A * 10/1987 Sollars, Jr. .......... 356/138
4,921,735 A 5/1990 Bloch .................. 428/34.9
4,944,529 A 7/1990 Blackhaus .......... 280/743.1
4,977,016 A 12/1990 Thornton et al. .......... 428/225
4,994,225 A 2/1991 Davis .................. 264/257
4,999,488 A * 3/1991 Sollars .................. 250/222.2
5,011,183 A 4/1991 Thornton et al. .......... 280/743
5,073,418 A 12/1991 Thornton et al. .......... 428/34.9
5,087,071 A 2/1992 Wallner et al. .......... 280/743.1
5,090,729 A 2/1992 Wantabe .................. 280/743.1
5,093,163 A 3/1992 Krummheuer et al. ..... 428/35.1
5,098,125 A 3/1992 Thornton et al. .......... 280/743
5,110,666 A 5/1992 Menzel et al. .......... 428/196
5,114,180 A 5/1992 Kami et al. .......... 280/743
5,208,097 A 5/1993 Honma et al. .......... 428/35.7
5,213,363 A 5/1993 Fukumori et al. .......... 280/743
5,236,775 A 8/1993 Swoboda et al. .......... 428/219
5,277,230 A * 1/1994 Sollars, Jr. .......... 139/389
5,310,216 A 5/1994 Wehner et al. .......... 280/743.1
5,316,337 A 5/1994 Yamaji et al. .......... 280/743.1
5,336,538 A 8/1994 Kitamura .................. 428/226
5,356,680 A 10/1994 Krummheuer et al. ..... 428/36.1
5,399,402 A 3/1995 Inoue et al. .......... 428/35.7
5,421,378 A 6/1995 Bower et al. .......... 139/435.1
5,423,273 A 6/1995 Hawthorn et al. .......... 112/441
5,445,414 A 8/1995 Pittman et al. .......... 280/743.1
5,454,594 A 10/1995 Krickl .................. 280/743.1
5,477,890 A 12/1995 Krummheuer et al. .. 139/291 R
5,482,318 A * 1/1996 Sollars, Jr. .......... 280/743.1
5,503,197 A 4/1996 Bower et al. .......... 139/435.1
5,508,073 A 4/1996 Krummheuer et al. ..... 428/35.1
5,520,416 A 5/1996 Singer, III et al. .......... 280/775
5,529,837 A 6/1996 Fujiki et al. .......... 428/266
5,533,755 A 7/1996 Nelsen et al. .......... 280/743.1
5,554,424 A 9/1996 Krummheuer et al. ... 280/728.1
5,637,114 A 6/1997 Hohnke .................. 139/389
5,650,207 A 7/1997 Crouch .................. 139/389
5,651,395 A 7/1997 Graham et al. .......... 139/390
5,685,347 A 11/1997 Graham et al. .......... 139/390
5,704,402 A * 1/1998 Bowen et al. .......... 139/389
5,707,711 A 1/1998 Kitamura .................. 428/193
5,776,839 A 7/1998 Dischler et al. .......... 442/239
5,788,270 A 8/1998 Haland et al. .......... 280/729
5,858,886 A 1/1999 Bowen et al. .......... 280/728.1
5,865,464 A 2/1999 Kanuma et al. .......... 280/743.1
5,897,929 A 4/1999 Li et al. .................. 280/728.1
5,921,287 A * 7/1999 Bowen et al. .......... 139/389
5,945,186 A 8/1999 Li et al. .................. 428/36.1
5,989,660 A 11/1999 Moriwaki et al. .......... 428/35.2
5,994,243 A 11/1999 Bowen et al. .......... 442/203
6,019,390 A 2/2000 Keshavaraj .......... 280/743.1
6,086,095 A 7/2000 Keshavaraj .......... 280/743.1
6,169,043 B1 1/2001 Li .......................... 442/71
6,177,365 B1 1/2001 Li .......................... 442/71
6,177,366 B1 1/2001 Li .......................... 442/71
6,220,309 B1 * 4/2001 Sollars, Jr. .......... 139/389
6,294,487 B1 9/2001 Keshavaraj .......... 442/218
6,299,204 B1 10/2001 Keshavaraj .......... 280/743.1
6,299,205 B1 10/2001 Keshavaraj .......... 280/743.1
6,299,206 B1 10/2001 Keshavaraj .......... 280/743.1
6,299,965 B1 10/2001 Keshavaraj .......... 428/125
6,327,759 B1 12/2001 Keshavaraj et al. .......... 26/18.6
6,328,334 B1 12/2001 Kanuma .................. 280/730.2
6,429,155 B1 * 8/2002 Li et al. .................. 442/76
6,451,715 B2 * 9/2002 Li et al. .................. 442/76
6,467,511 B1 * 10/2002 Sollars .................. 139/430
6,595,244 B1 * 7/2003 Sollars, Jr. .......... 139/389
6,688,642 B2 * 2/2004 Sollars, Jr. .......... 280/733
6,698,458 B1 * 3/2004 Sollars et al. .......... 139/389
6,701,971 B1 * 3/2004 Sollars et al. .......... 139/387 R
6,830,261 B2 * 12/2004 Sollars, Jr. .......... 280/729
6,978,808 B2 * 12/2005 Walsh et al. .......... 139/11
7,069,961 B2 * 7/2006 Sollars, Jr. .......... 139/389
7,296,328 B1 * 11/2007 Petri et al. .......... 26/27
D573,352 S * 7/2008 Sollars, Jr. .......... D5/47
7,409,970 B2 * 8/2008 Sollars, Jr. .......... 139/389
2001/0005660 A1 * 6/2001 Li et al. .................. 442/71
2001/0009829 A1 * 7/2001 Sollars et al. .......... 442/76
2001/0012743 A1 8/2001 Vogt et al. .......... 442/131
2001/0020780 A1 9/2001 Cato et al. .......... 280/743.1
2001/0028166 A1 10/2001 Gilpatrick et al. ........ 280/743.1
2001/0031325 A1 10/2001 Keshavaraj .......... 428/35.2
2001/0042980 A1 * 11/2001 Sollars, Jr. .......... 280/743.1
2001/0044515 A1 11/2001 Siedel et al. .......... 526/351
2001/0054813 A1 12/2001 Keshavaraj .......... 280/43.1
2002/0036023 A1 * 3/2002 Sollars .................. 139/109
2003/0034640 A1 * 2/2003 Sollars, Jr. .......... 280/733
2003/0188797 A1 * 10/2003 Sollars, Jr. .......... 139/389
2005/0011578 A1 * 1/2005 Walsh et al. .......... 139/383 R
2005/0077708 A1 * 4/2005 Sollars, Jr. .......... 280/729
2005/0121891 A1 * 6/2005 Sollars, Jr. .......... 280/735
2006/0249933 A1 * 11/2006 Sollars, Jr. .......... 280/729
2007/0128963 A1 * 6/2007 Vogt et al. .......... 442/301
2008/0026657 A1 * 1/2008 Sollars .................. 442/76
2008/0302438 A1 * 12/2008 Sollars, Jr. .......... 139/410

FOREIGN PATENT DOCUMENTS

JP 0254446 10/1989
JP 0225155 9/1990
WO 9932332 7/1999
WO 0078577 12/2000
WO 0218180 3/2002
WO 0242071 5/2002
WO 0243988 6/2002

OTHER PUBLICATIONS

Safe & Sober—Side Air Bags, Window Curtain Air Bags, and Seat Belts Pretensioners in 1998 Model Vehicles—What First Responders Need to Know.
Thomson Gale—Taking Mercedes' S-Class on the Road in Switzerland, it almost makes you want to yodel.

* cited by examiner

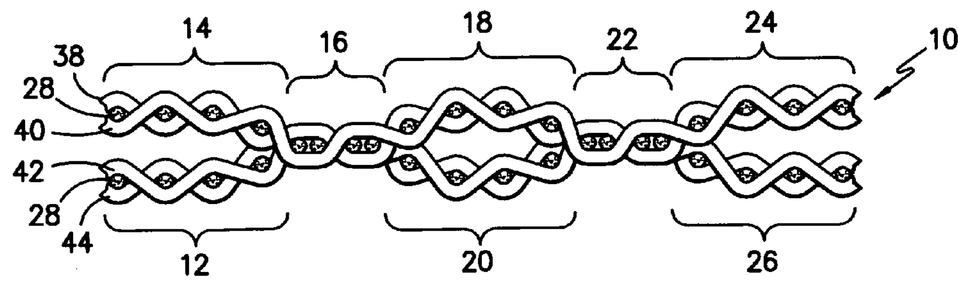
FIG. -1-
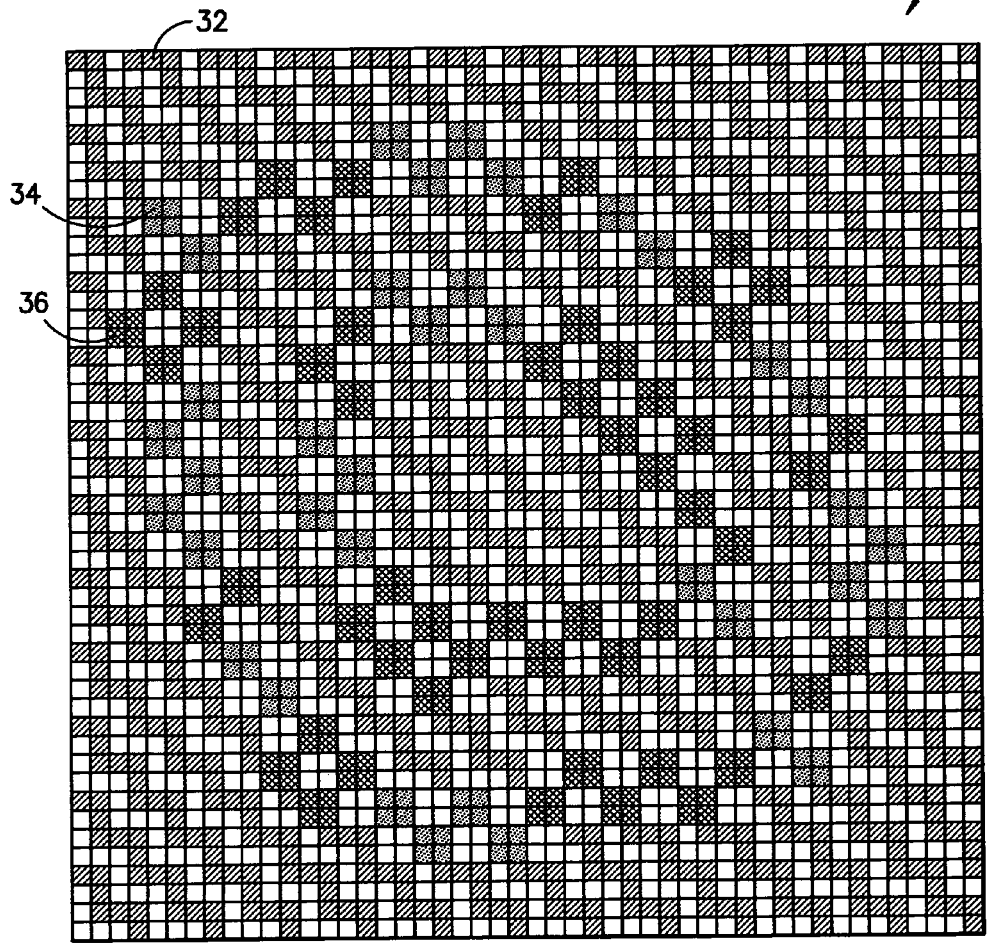
FIG. -2-

INFLATABLE FABRICS COMPRISING BASKET-WOVEN ATTACHMENT POINTS BETWEEN FABRIC PANELS

CROSS-REFERENCE TO RELATED APPLICATIONS

This application is a continuation of U.S. patent application Ser. No. 11/473,707 which was filed on Jun. 23, 2006 now U.S. Pat. No. 7,409,970, which is a continuation of U.S. patent application Ser. No. 10/408,874, filed on Apr. 8, 2003 now U.S. Pat. No. 7,069,961, which is a continuation of U.S. patent application Ser. No. 09/406,264 filed on Sep. 24, 1999 now granted as U.S. Pat. No. 6,220,309.

TECHNICAL FIELD

The invention relates to all-woven inflatable fabrics which comprise areas of two layers and attachment points or "seams" where single layers of fabric are formed. Such single fabric layers are constructed solely through the utilization of basket weave-patterns. These specific single fabric layers provide a relatively effective manner of reducing air permeability within the entire fabric article by decreasing the possibility of yarn shifting upon inflation of the inflatable fabric. Alternatively, the presence of at least a second single fabric layer area adjacent to the first and separated by a narrow double fabric layer can further reduce the possibility of yarn shifting in the first single fabric layer area. Such a fabric may be utilized in numerous and various applications wherein fabric inflation is desired or necessary. In particular, the inventive fabric may be incorporated within an airbag cushion.

BACKGROUND OF THE PRIOR ART

All U.S. patents cited herein are hereby fully incorporated by reference.

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state which can absorb the impact of the forward movement of a body and dissipate its energy by means of rapid venting of the gas. The entire sequence of events occurs within about 30 milliseconds. In the undeployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,414 to Bishop; U.S. Pat. No. 5,454,594 to Krickl; U.S. Pat. No. 5,423,273 to Hawthorn et al.; U.S. Pat. No. 5,316,337 to Yamaji et al.; U.S. Pat. No. 5,310,216 to Wehner et al.; U.S. Pat. No. 5,090,729 to Watanabe; U.S. Pat. No. 5,087,071 to Wallner et al.; U.S. Pat. No. 4,944,529 to Backhaus; and U.S. Pat. No. 3,792,873 to Buchner et al.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch; U.S. Pat. No. 5,093,163 to Krummheuer et al.; U.S. Pat. No. 5,110,666 to Menzel et al.; U.S. Pat. No. 5,236,775 to Swoboda et al.; U.S. Pat. No. 5,277,230 to Sollars, Jr.; U.S. Pat. No. 5,356,680 to Krummheuer et al.; U.S. Pat. No. 5,477,890 to Krummheuer et al.; U.S. Pat. No. 5,508,073 to Krummheuer et al.; U.S. Pat. No. 5,503,197 to Bower et al.; and U.S. Pat. No. 5,704,402 to Bowen et al. A two-weave construction airbag cushion is exemplified in U.S. Pat. No. 5,651,395 to Graham et al. but does not discuss the importance of narrow basket-weave single fabric layers.

As will be appreciated, the permeability of an airbag cushion structure is an important factor in determining the rate of inflation and subsequent rapid deflation following the impact event. Different airbag cushions are utilized for different purposes. For instance, some airbag cushions are installed within inflation modules for driver protection within the steering column of an automobile. Others are utilized as protection for front seat passengers and are installed in and around the glove compartment and/or on the dashboard in front of such a passenger seat. Still others have been developed in an effort to protect all passengers during a long-duration impact event, such as, for example, a rollover collision. In those types of crashes, the target airbag cushion must inflate quickly under high pressure (such as between about 10 and 40 psi) and remain inflated at a relatively high pressure in order to provide the greatest degree of protection to such passengers. Furthermore, such long-duration airbag cushions preferably comprise "pillow" formations created through the attachment of at least two different fabrics or fabric ends together and sealed, sewn, or the like, together. Upon inflation the free space between the attachment points inflate as well, thereby producing the desired cushioned "pillow" structures. Such long-duration, "pillowed" structures have been disclosed in the prior art as airbag cushions within U.S. Pat. No. 5,788,270 to Halano. However, in order to provide a suitable, effective airbag fabric and cushion comprising two or more points of attachment between fabrics or fabric ends, there has been a need to improve upon the structural integrity of the seams at such attachment points to prevent unwanted and potentially harmful leakage of gas or air from within the target airbag cushion. The prior art has discussed the development of coatings to place over the sewn seams at such attachment points in order to seal the potentially loose portions of such seams and/or to keep the individual yarns of the airbag fabrics at the attachment points stationary in order to prevent yarn shifting and thus possible openings for air or gas leakage. However, such coatings are actually supplemental to the seam structures in providing the necessary barrier to air or gas. A strong, effective, efficient weave construction is the primary method of initially producing an effective airbag fabric for incorporation within an airbag cushion.

Previous attempts have been made at producing inflatable fabrics comprising "pillowed" chambers (such as for side curtains, and the like) which have been produced solely through a weaving procedure and which exhibit reduced air permeability within their weave constructions (in other words, fabrics which are not sewn together to form an inflatable structure). For instance, the closest art appears to be U.S. Pat. No. 5,011,183 to Thornton et al. which discloses an inflatable fabric structure comprising at least two different areas of differing fabric layers. Patentees discuss two layers of fabric produced by a plain weave and single layer constructions of a plurality of different weave patterns. The interface between the two different fabric layer areas must exhibit at least three different fabric densities (which are dictated by weave constructions), wherein the two looser constructions (double layer plain weave and single layer basket weave) are separated by a tighter construction (single layer plain weave). Such an overall inflatable fabric structure may possess the necessary air permeability characteristics required for proper functioning within a side curtain airbag cushion (particularly upon coating with a standard airbag coating composition); however, the numerous differences in fabric densities also place varying pressures upon discrete areas of the fabric (particularly at or near the interface between the differing fabric layer areas) such that yarn shifting will, most likely occur during an inflation event which may produce discontinuities in the integrity of the coating which may in turn compromise the long-term air permeability required for certain airbag applications.

Attempts have been made at improving on such a fabric; however these have led to an increase in the number of different fabric density areas on the fabric, rather than reducing such differing densities. For example, a plain weave construction has been utilized within the double layer area, adjacent to a transition weave pattern, which connects with an Oxford weave pattern, and then either a basket-weave or plain weave construction for the remainder of the single layer area on the fabric. Such a complicated scheme is difficult to produce on a weaving apparatus, as an initial problem. Secondly, the utilization of an Oxford weave zone has been utilized in an attempt to prevent the possibility of weaving in a plain pattern (which is highly undesirable due to the difficulty in manufacturing such high density single-layers fabrics from double-layer amounts of yarn). However, if the area of single layer of fabric is not substantially a straight line, and thus must follow a curved structure, the Oxford weave will eventually become a plain weave for at least that area around such a curved seam. In such an instance, the interface between the two differing layers of fabric will be irregular and invariably produce an undesirable and/or irregular number of floats (i.e., yarns which pass either over or under a certain number of perpendicularly oriented yarns; greater than three such oriented yarns would produce difficulties in preventing yarn shifting, as merely one example). As such, the resultant fabric is itself highly undesirable as a barrier to air permeability, even though coatings may be applied to increase such performance. Thirdly, the individual yarns at the seam between the double and single layer areas, will be placed upon tremendous strain during an inflation event and, as in the Thornton et al. teaching, will most likely result in yarn shifting. With such shifting yarns, the permeability benefits, if any, would, again, most likely be compromised and the produced airbag fabric would not function as required.

To date, there has been no method or fabric structure which has remedied these problems and still can be efficiently woven in a one-step process. A clear need for such an improvement in inflatable fabrics is thus necessary.

SUMMARY OF THE INVENTION

In view of the foregoing, it is a general object of the present invention to provide an inflatable all-woven fabric having all-basket-woven seams at the single/double layer interfaces within the fabric. It is a more particular object of the present invention to provide an all-woven inflatable fabric with double layer zones of fabric and single layer zones of fabric (to form "pillowed" chambers) which comprises at most two different fabric densities throughout the entire fabric structure. Also, an object of this invention is for the utilization of such inflatable fabrics as airbag cushions within a vehicle restraint system. The term "vehicle restraint system" is intended to mean both inflatable occupant restraining cushion and the mechanical and chemical components (such as the inflation means, ignition means, propellant, and the like).

To achieve these and other objects and in accordance with the purpose of the invention, as embodied and broadly described herein, the invention provides an inflatable fabric comprising at least two layers of fabric in certain discrete areas of the fabric and at least one narrow single fabric layer at a discrete area within said fabric, wherein said at least one narrow single fabric layer is formed solely from a basket weave pattern of an even number of yarns, at most 12 yarns in width; preferably, and as well known to the skilled artisan in the fabric weaving industry, the weave structure for said single layer fabrics is a 2×2 basket weave pattern at most from 4 to 8 yarns in length. Also, this invention encompasses an inflatable fabric comprising at least two layers of fabric in certain discrete areas of the fabric and at least one single fabric layer at a discrete area within said fabric, wherein the weave diagram for such a fabric does not exhibit more than three consecutive unfilled blocks in any row or column. Furthermore, this invention also concerns an inflatable fabric comprising at least two layers of fabric in certain discrete areas of the fabric and at least one single fabric layer at a discrete area within said fabric, wherein only two separate weave densities are present within the entire fabric structure.

The term "inflatable fabric" is intended to encompass any fabric which is constructed of at least two layers of fabric which can be sealed to form a bag article. The inventive inflatable fabric thus must include double layers of fabric to permit such inflation, as well as single layers of fabric either to act as a seal at the ends of such fabric panels, or to provide "pillowed" chambers within the target fabric upon inflation. The term "all-woven" as it pertains to the inventive fabric thus requires that the inflatable fabric having double and single layers of fabric be produced solely upon a loom. Any type of loom may be utilized for this purpose, such as water-jet, airjet, rapier, dobby, and the like. Jacquard weaving and dobby weaving, however, are most preferred.

The constructed fabric may exhibit balanced or unbalanced pick/end counts; the main requirement in the woven construction is that the single layer areas of the inflatable fabric exhibit solely basket-weave patterns. These patterns are made through the arrangement of at least one warp yarn (or weft yarn) configured around the same side of two adjacent weft yarns (or warp yarns) within the weave pattern. The resultant pattern appears as a "basket" upon the arrangement of the same warp (or weft) yarn to the opposite side of the next adjacent weft (or warp) yarn. Such basket weave patterns may include the arrangement of a warp (or weft) yarn around the same side of any even number of weft (or warp) yarns, preferably up to about six at any one time.

The sole utilization of such basket weave patterns in the single layer zones provides a number of heretofore unexplored benefits within inflatable fabric structures. For example, such basket weave patterns permit a constant "seam" width and weave construction over an entire single layer area, even where the area is curved. As noted above, the standard Oxford weaves currently utilized cannot, remain as the same weave pattern around curved seams; they become plain weave patterns. Also, such basket weave seam patterns permit the construction of an inflatable fabric having only plain woven double layer fabric areas and single layer "seams" with no "floats" of greater than three picks within the entire fabric structure. Such a fabric would thus not possess discrete locations where the air permeability is substantially greater than the remaining portions of the fabric. Generally, the prior art (such as Thornton et al., supra) produce floats of sometimes as much as six or seven picks at a time. Although available software to the weaving industry permits "filling in" of such floats within weave diagrams, such a procedure takes time and still does not continuously provide a fabric exhibiting substantially balanced air permeability characteristics over the entire structure. The basket-weave formations within the single fabric layers thus must be positioned in the fabric so as to prevent irregularities (large numbers of floats, for example) in the weave construction at the interface between the single and double fabric layers (as described in FIG. 2, below). Another benefit such basket weave patterns accord the user is the ability to produce more than one area of single layer fabric (i.e., another "seam" within the fabric) adjacent to the first "seam." Such a second seam provides a manner of dissipating the pressure from or transferring the load upon each individual yarn within both seams. Such a benefit thus reduces the chances of deleterious yarn shifting during an inflation event through the utilization of strictly a woven fabric construction (i.e., not necessarily relying upon the utilization of a coating as well). The previously disclosed or utilized inflatable fabrics having both double and single fabric layer areas have not explored such a possibility in utilizing two basket-weave pattern seams. Furthermore, such a two-seam construction eliminates the need for weaving a large single fabric layer area within the target inflatable fabric. The prior art fabrics which produce "pillowed" chambers for airbag cushions (such as side curtains), have been formed through the weaving of entire areas of single fabric layers (which are not actually seams themselves). Such a procedure is time-consuming and rather difficult to perform. The inventive inflatable fabric merely requires, this alternative embodiment, at least two very narrow single fabric layer areas (seams) woven into the fabric structure (another preferred embodiment utilizes merely one seam of single layer fabric); the remainder of the fabric located within these two areas may be double layer if desired. Thus, the inventive fabric permits an improved, cost-effective, method of making a "pillowed" inflatable fabric.

The inflatable fabric itself is preferably produced from all-synthetic fibers, such as polyesters and polyamides, although natural fibers may also be utilized in certain circumstances. Preferably, the fabric is constructed of nylon-6,6. The individual yarns utilized within the fabric substrate must generally possess deniers within the range of from about 40 to about 840; preferably from about 100 to about 630.

As noted above, coatings should be applied to the surface as a necessary supplement to the air permeability of the inventive fabric. Since one preferred ultimate use of this inventive fabric is as a side curtain airbag which must maintain a very low degree of air permeability throughout a collision event (such as a rollover where the curtain must protect passengers for an appreciable amount of time), a decrease in permitted air permeability is highly desirable. Any standard coating, such as a silicone, polyurethane, polyamide, polyester, rubber (such as neoprene, for example), and the like, may be utilized for this purpose and may be applied in any standard method and in any standard amount on the fabric surface.

Additional objects and advantages of the invention will be set forth in part in the description which follows, and in part will be obvious from the description, or may be learned by practice for the invention. It is to be understood that both the foregoing general description and the following detailed description of preferred embodiments are exemplary and explanatory only, and are not to be viewed as in any way restricting the scope of the invention as set forth in the claims.

BRIEF DESCRIPTION OF THE DRAWINGS

The accompanying drawings, which are incorporated in and constitute a part of this specification, illustrate several potentially preferred embodiments of the invention and together with the description serve to explain the principles of the invention wherein:

FIG. 1 is a cross-sectional view of an inventive all-woven inflatable fabric showing the preferred double and single layer areas including two separate single layer areas.

FIG. 2 is a weave diagram illustrating a potentially preferred repeating pick pattern formed using repeating plain weave and basket weave four-pick arrangements.

DESCRIPTION OF THE PREFERRED EMBODIMENT

Turning now to the drawings, in FIG. 1 there is shown a cross-section of a preferred structure for the double fabric layers 12, 14, 18, 20, 24, 26 and single fabric layers 16, 22 of the inventive inflatable fabric 10. Weft yarns 28 are present in each of these fabric layer areas 12, 14, 16, 18, 20, 22, 24, 26 over and under which individual warp yarns 38, 40, 42, 44 have been woven. The double fabric layers 12, 14, 18, 20, 24, 26 are woven in plain weave patterns. The single fabric layers 16, 22 are woven in basket weave patterns. Four weft yarns each are configured through each repeating basket weave pattern within this preferred structure; however, anywhere from two to twelve weft yarns may be utilized within these single fabric layer areas (seams) 16, 22. The intermediate double fabric layer areas 18, 20 comprise each only four weft yarns 28 within plain weave patterns. The number of such intermediate weft yarns 28 between the single fabric layer areas 16, 22 must be in multiples of two to provide the maximum pressure bearing benefits within the two seams 16, 22 and thus the lowest possibility of yarn shifting during inflation at the interfaces of the seams 16, 22 with the double fabric layer areas 12, 14, 24, 26.

FIG. 2 shows the weave diagram 30 for an inventive fabric which comprises two irregularly shapes concentric circles as the seams. Such a diagram also provides a general explanation as to the necessary selection criteria of placement of basket-weave patterns within the fabric itself. Three different types of patterns are noted on the diagram by different shades. The first 32 indicates the repeated plain weave pattern throughout the double fabric layers (12, 14,18, 20, 24, 26 of FIG. 1, for example) which must always initiate at a location in the warp direction of 4X+1, with X representing the number of pick arrangement within the diagram, and at a location in the fill direction of 4X+1 (thus, the pick arrangement including the specific two-layer plain-weave-signifying-block 32 begins at the block four spaces below it in both directions). The second 34 indicates an "up-down" basket weave pattern wherein an empty block must exist and always initiate the basket-weave pattern at a location in the warp direction of 4X+1, with X representing the number of repeating-pick arrangements- within the diagram, and at a location in the fill direction of 4X+1, when a seam (such as 16 and 22 in FIG. 1) is desired (thus, the pattern including the pertinent signifying "up-down" block 34 includes an empty block within the basket-weave pick arrangement in both the warp and fill directions four spaces below it). The remaining pattern, which is basically a "down-up" basket weave pattern to a single fabric layer (such as 16 and 22 in FIG. 1) is indicated by a specifically shaded block 36. Such a pattern must always initiate at a location in the warp direction of 4X+1 and fill of 4X+3, or warp of 4X+3 and fill of 4X+1, when a seam is desired. Such a specific arrangement of differing "up-down" basket weave 34 and "down-up" basket weave 36 pattern is necessary to effectuate the continuous and repeated weave construction wherein no more than three floats (i.e., empty blocks) are present simultaneously within the target fabric structure. Furthermore, again, it is believed that there has been no such disclosure or exploration of such a concept within the inflatable fabric art.

While specific embodiments of the invention have been illustrated and described, it is to be understood that the invention is not limited thereto, since modifications may certainly be made and other embodiments of the principals of this invention will no doubt occur to those skilled in the art. Such modifications include, but are in no way limited to, the ability to produce reverse, mirror, or offset versions of the aforementioned two-pattern combinations within the inventive fabrics. Therefore, it is contemplated by the appended claims to cover any such modifications and other embodiments as incorporate the features of this invention which in the true spirit and scope of the claims hereto.

I claim:

1. An inflatable fabric comprising two layers of fabric in first discrete areas and at least one single layer of fabric positioned at a second discrete area, wherein the two layer(s) and the single layer meet at an interface, the single layer being comprised in part of a two-by-two basket weave pattern adjacent the interface.

2. The fabric of claim 1 wherein the single layer of fabric within the inflatable fabric is formed solely from one or more basket weave patterns.

3. The fabric of claim 1 wherein said single layer comprises at least two portions, the two portions being divided by a separator two layer fabric area.

4. The fabric of claim 3 wherein the separator two layer fabric area comprises an even number of weft yarns.

5. The fabric of claim 1 wherein the single layer two-by-two basket weave pattern positioned adjacent the interface is 4 total yarns in width.

6. The fabric of claim 1 wherein the single layer comprises at least two portions, the first portion comprising a two-by-two basket weave pattern positioned adjacent the interface and a second portion comprising an additional basket weave pattern having three or four yarns per basket.

7. An inflatable fabric comprising at least one non-rectangular seam, the seam being formed in part by a curved narrow discrete single layer area and a least one adjacent two layer area within the inflatable fabric, wherein the single layer area and the two layer area meet at a single/double layer interface, the single layer area being formed from a basket weave having an even number of yarns.

* * * * *